United States Patent Office 3,660,424
Patented May 2, 1972

3,660,424
3-PHENYL-7-[4'-CHLOROPYRAZOLYL-(1')]-COUMARINS
Guglielmo Kabas, Binningen, Basel-Land, and Reinhard Zweidler, Basel, Switzerland, assignors to Ciba-Geigy Corporation, Ardsley, N.Y.
No Drawing. Filed June 16, 1969, Ser. No. 833,782
Claims priority, application Switzerland, June 26, 1968, 9,532/68
Int. Cl. C07d *49/18*
U.S. Cl. 260—310 R                 6 Claims

ABSTRACT OF THE DISCLOSURE

3 - phenyl - 7 - [4'-chloropyrazolyl-(1')]-coumarins which may bear further substituents especially at the 3'- and 5'-position of the pyrazolyl nucleus, are described as optical brighteners affording superior degree of whiteness and fluorescence number as well as better fastness to chlorite bleaching baths on such substrates as polyester and other polymeric organic materials. A preferred compound is 3-phenyl-7-[3'-methyl-4'-chloropyrazolyl-(1')]-coumarin. A method of brightening polymeric materials, e.g. fibers are films with the word compound as well as polymeric materials brightened therewith are also disclosed.

---

The present invention concerns new 3-phenyl-7-[4'-chloropyrazolyl-(1)]-coumarins, processes for their production and the use of the 3-phenyl-7-[4'-chloropyrazolyl-(1')]-coumarins as optical brighteners.

It has been found that brighteners of the 3-phenyl-7-[4'-chloropyrazolyly-(1')]-coumarin series with improved shade of colouring are obtained by chlorinating 3-phenyl-7-[pyrazolyl-(1')]-coumarins with unoccupied 4-position in the pyrazolyl radical, to obtain a compound of the Formula I,

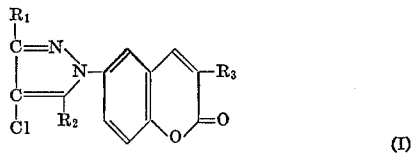

(I)

wherein $R_1$ and $R_2$ each represent hydrogen, alkyl having 1–4 carbon atoms, an optionally substituted aromatic radical, halogen up to atomic number 35, or the trifluoromethyl group and $R_3$ represents an optionally substituted phenyl group.

The 3-phenyl-7-[pyrazolyl-(1')]-coumarins and also the new 3-phenyl-7-[4'-chloropyrazolyl-(1')]-coumarins, which are usable as starting material, can be further mono- or poly-substituted by non-chromogenic substituents at the 3-phenyl radical as well as in $R_1$ and in $R_2$, if these represent substituted, aromatic radicals. Suitable as suchlike substituents are, e.g. alkyl groups such as methyl, ethyl, propyl, isopropyl, n-butyl groups, halogens such as fluorine, but especially chlorine, alkoxy groups such as methoxy, ethoxy, propoxy, butoxy groups, also the sulphamide group and the sulphamide groups substituted at the nitrogen atom such as N,N-dialkylsulphamoyl groups, alkylsulphonyl groups such as methylsulphonyl, ethylsulphonyl, butylsulphonyl groups.

The 3 - phenyl-7-[4'-chloropyrazolyl-(1')]-coumarins, according to the invention, are produced in surprisingly high yield and grade of purity by chlorination of the 3-phenyl-7-[pyrazolyl-(1')]-coumarins, which are unoccupied in 4-position of the pyrazolyl radical, preferably with sulphuryl chloride in non-polar solvents such as, for example, in tetrachlorethane. The chlorination of the 3-phenyl-7-[pyrazolyl-(1')]-coumarins to give the corresponding 3-phenyl-7-[4'-chloropyrazolyl-(1')]-coumarins can also be carried out with hypochlorite/glacial acetic acid or phosphorus pentachloride. The chlorination of the 3 - phenyl - 7-[pyrazolyl-(1')]-coumarins is performed analogously to the chlorination reactions of heterocycles, known from the literature (see e.g. R. Fusco "Pyrazoles, Pyrazolines, Indazoles and Condensed Rings," in "The Chemistry of Heterocyclic Compounds," by A. Weissberger, Interscience Publishers, 1967, p. 84 and Th. L. Jacobs, "Pyrazoles and Related Compounds," in "Heterocyclic Compounds" by R. C. Elderfied, John Wiley and Sons, Inc., 1957, p. 97).

According to the invention, the brighteners of the 3-phenyl-7-[4'-chloropyrazolyl-(1')]-coumarin series having an improved shade can also be produced by condensing a 3-phenyl-7-hydrazino-coumarin, which can be further substituted, or a compound which reacts like a 3-phenyl-7-hydrazino-coumarin, with an aliphatic-α-chloro-β-dicarbonyl compound, which in the end position can be further substituted, or with a compound containing a group which reacts like a corresponding aliphatic-α-chloro-β-dicarbonyl compound, to give an optionally substituted 3-phenyl-7-[4'-chloropyrazolyl-(1')]-coumarin.

3-phenyl-7-hydrazino-coumarins, usable as starting materials, are easily obtained from the known 3-phenyl-7-amino-coumarins by diazotisation and reduction of the diazo group to the hydrazino group, whereby the usual agents are used for the reduction, e.g. soluble salts of sulphurous acid, zinc in alkaline solution or stannous salts in acid solution. Instead of the free hydrazino compound, it is possible to use derivatives thereof, which react in a like manner, e.g. its more stable salts with strong mineral acids such as the hydrochlorides, the hydrobromides, the sulphates and also, optionally, the corresponding hydrazino-N-sulphonic acids or the corresponding N-acylhydrazino compounds, which have been condensed with the dicarbonyl compounds under conditions simultaneously producing the liberation of the hydrazino group.

Aliphatic-α-chloro-β-dicarbonyl compounds, according to the invention, can only have, as substituents in the end position, hydrogen or also monovalent organic radicals, e.g. alkyl, aralkyl such as benzyl, cycloalkyl, aryl such as phenyl, alkylphenyl, alkoxyphenyl, halogen phenyl, heterocyclic radicals such as thienyl, furfuryl groups, i.e. it is possible to use as starting materials, β-dialdehydes, β-ketoaldehydes and β-diketones, or compounds which react like these, whereby the stated starting materials are substitued in α-position by chlorine.

Compounds, usable according to the invention, which have an aliphatic-α-halogen-β-dicarbonyl group are the β-diketones such as, e.g.
α-chloroacetylacetone,
α-chloropropionylacetone,
α-chlorobutyroylacetone,
α-chloroacetylisobutyroylmethane,
α-chloroacetylcapyropylmethane,
α-chlorodibenzoylmethane,
α-chlorobenzoylacetone,
α-chloropropionylacetophenone,
α-chlorobutyroylacetophenone,
α-chlorophenylacetylacetone;

the β-ketoaldehydes or the acetals and hydroxymethylene ketones reacting like the latter, e.g.

α-chloro-β-ketobutyroylaldehyde-dimethylacetal,
α-chloroformylacetone or
α-chlorohydroxymethyleneacetone,
2-hydroxymethylene diethyl ketone,
α-chlorodiethylacetylacetaldehyde,
trimethylacetylacetaldehyde,
isovalerylacetaldehyde, α-chloroformylacetophenone or
α-chlorohydroxymethyleneacetophenone;
β-dialdehyde or the acetals and α-(acyloxymethylene)-
and α-(alkoxymethylene)-aldehydacetals, which react like the latter, e.g.

α-chloromalonaldehyde,
α-chloromalonaldehydetetraethylacetal,
α-chloro-β-ethoxyacroleinacetal.

Suitable compounds, usable according to the invention, containing a group reacting like an aliphatic α-halogen-β-dicarbonyl compound are, e.g. the already mentioned α-hydroxymethylene ketones as well as their ethers, esters or anilides, also aldehyde or ketacetals; it is possible, namely, to use derivatives of the above mentioned dialdehydes, aldehyde ketones or diketones, in which only one carbonyl group is acetalised or both carbonyl groups are acetalised.

Finally, instead of the above mentioned β-dicarbonyl compounds, which are substituted in α-position by chlorine, it is also possible to use their addition products with acid alkali salts of sulphurous acid, whereby the condensation conditions are advantageously so chosen, that the carbonyl group is regenerated. All organic radicals in these compounds can, optionally, also contain inert substituents.

The condensation of the 7-hydrazino-3-phenylcoumarin, or of a derivative reacting as such, with the α-chloro-β-dicarbonyl compound or with a corresponding acetal is advantageously performed in a polar organic solvent in the presence of acid reaction-accelerators. A suitable solvent is glacial acetic acid which, optionally, can be used in admixture with other solvents.

The optical brighteners of the Formula I, according to the invention, are distinguished, compared with optical brighteners which are not substituted in 4-position of the pyrazolyl radical by chlorine, in that the fluorescence number and the degree of whiteness, e.g. on polyester in the case of the 3-phenyl-7-[4'-chloropyrazolyl-(1')]-coumarin compounds, according to the invention, are appreciably more favourable. Furthermore, the optical brighteners of the Formula I are characterised by an improved fastness to chlorine, and in chlorite bleaching they discolour less than the corresponding 3-phenyl-7-[pyrazolyl-(1')]-coumarins which are free of chlorine in 4-position of the pyrazolyl radical. Compared with the chlorine-free compounds, the optical brighteners, according to the invention, moreover exhibit a, in practice, desired redder shade on the optically brightened polymeric material treated therewith, especially on polyester material. The optical brighteners, according to the invention, are also suitable for use, e.g. on polypropylene, polyethylene and polyamide. The brightening agents can also be used in casting or spinning solutions made from polyvinyl chloride, polypropylene, polyester, polyamide, polyvinylidene chloride, polystyrene, polymeric and copolymeric acrylonitrile used in the production of synthetic structures such as films, fibres, threads, bristles or such like. The brighteners of Formula I, according to the invention, can also be added to, or worked into, washing agents, softeners or similar agents, such as finishing auxiliaries.

The 3-phenyl-7-[4'-chloropyrazolyl - (1')] - coumarin compounds, according to the invention, can be used as optical brighteners in the usual manner, i.e. either in the form of solutions in organic solvents, or in the form of solutions or dispersions in water.

Particularly superior brightening results are obtained with the compounds falling under Formula I in which $R_1$ represents hydrogen, methyl, trifluoromethyl, phenyl or tolyl,
$R_2$ represents hydrogen, methyl, chlorine or trifluoromethyl, and
$R_3$ represents a phenyl radical any substituent of which is selected from middle halogen or methyl.

Most preferred are those compounds of Formula I in which $R_1$ represents methyl or phenyl,
$R_2$ represents hydrogen and
$R_3$ represents phenyl.

The following examples illustrate the invention. Where otherwise not specifically stated, the term "parts" denotes parts by weight. The temperatures are given in degrees centigrade. Parts by weight to parts by volume are in the same ratio as gram to cubic centimeter.

EXAMPLE 1

30.2 parts of 3-phenyl-7-[3'-methylpyrazolyl-(1')]-coumarin are dissolved, while stirring, in 300 parts by volume of tetrachloroethane and to the obtained solution are added dropwise at 25–30°, while stirring and within 1 hour, 16.8 parts of sulphuryl chloride dissolved in 15 parts by volume of tetrachloroethane. The chlorinated pyrazolyl coumarin precipitates during the addition of the sulphuryl chloride. After completion of the addition of the sulphuryl chloride, the obtained suspension is heated for 2 hours to 60–70°, cooled to room temperature and distilled with steam. The precipitated product is filtered off, dried and purified by recrystallisation from toluene/chlorobenzene (7:1). The 3-phenyl-7-[3'-methyl-4'-chloropyrazolyl-(1')] - coumarin is obtained as slightly yellowishly coloured crystals, M.P. 220–221°.

$Analysis.$—$C_{19}H_{13}ClN_2O_2$ (336.75). Calculated (percent): C, 67.77; H, 3.89; Cl, 10.53; N, 8.31; O, 9.50. Obtained (percent): C, 67.49; H, 3.88; Cl, 10.82; N, 8.34; O, 9.50.

The product dissolves in acetone with a blue-violet fluorescence. The new compound is very suitable for the brightening of various organic polymeric materials, especially synthetic textile fibres and polymeric plastics.

EXAMPLE 2

30.2 parts of 3 - phenyl - 7-[3'-methylpyrazolyl-(1')]-coumarin are dissolved, while stirring, in 200 parts by volume of tetrachloroethane at 70° and, within 1½ hours, 16.8 parts of sulphuryl chloride in 15 parts by volume of tetrachloroethane are added. The obtained white suspension is heated, while stirring, for 1 hour at 70° and thereafter cooled to 0°. The obtained white precipitate is filtered off, washed well with n-hexane and recrystallised from toluene/chlorobenzene (7:1). The 3-phenyl-7-[3'-methyl-4'-chloropyrazolyl(1')]-coumarin is thus obtained having the properties described in Example 1.

If in this example instead of 3-phenyl-7-[3'-methylpyrazolyl-(1')]-coumarin is used:

31.6 parts of 3-phenyl-7-[3',5'-dimethyl-pyrazolyl-(1')]-coumarin, or
36.4 parts of 3-phenyl-7-[3'-phenyl-pyrazolyl-(1')]-coumarin, or
37.8 parts of 3-phenyl-7-[3'-p-tolyl-pyrazolyl-(1')]-coumarin, or
37.0 parts of 3-phenyl-7-[3'-methyl-5'-trifluoromethyl-pyrazolyl-(1')]-coumarin, or
37.0 parts of 3-phenyl-7-[3'-trifluoromethyl-5'-methyl-pyrazolyl-(1')]-coumarin, or
33.6 parts of 3-phenyl-7-[3'-methyl-5'-chloropyrazolyl-(1')]-coumarin, or
39.8 parts of 3 - phenyl-7-[3'-phenyl-5'-chloropyrazolyl-(1')]-coumarin, the following compounds are obtained:

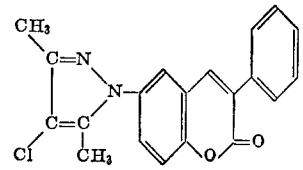

M.P. 215–216°

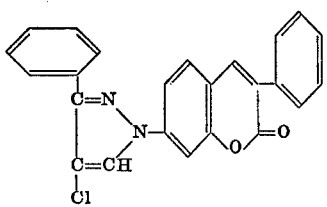
M.P. 221-223°

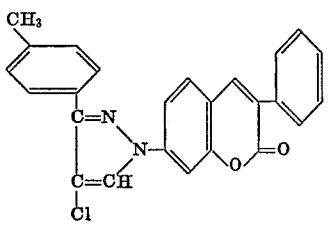
M.P. 233-234°

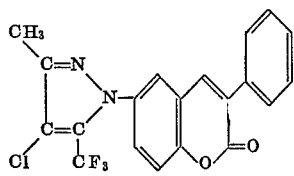
M.P. 189-191°

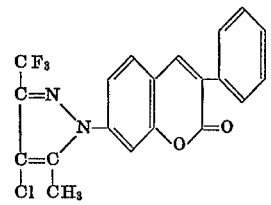
M.P. 198-199°

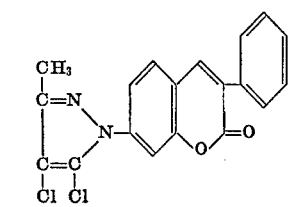
M.P. 246-247°

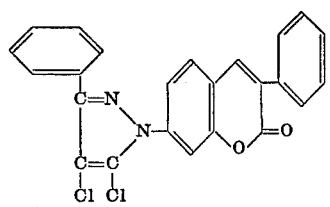
M.P. 218-219°

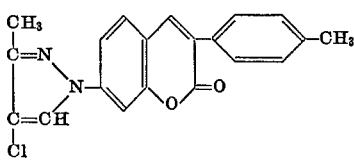

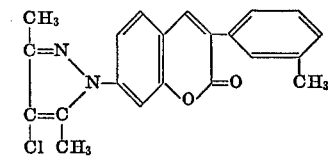

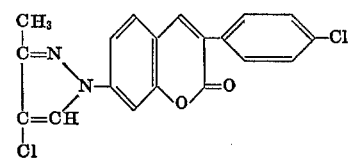

These compounds are valuable products for the optical brightening of polyester fibers.

EXAMPLE 3

(a) 2.9 parts of 3-phenyl-7-[pyrazolyl-(1')]-coumarin are dissolved, while stirring, in 150 parts by volume of tetrachloroethane. To the obtained solution are then added, while stirring and at 25–30°, 1.6 parts of sulphuryl chloride dissolved in 5 parts by volume of tetrachloroethane. The formed suspension is heated for 2 hours to 25–30° and for 1 hour to 50°, cooled to room temperature and distilled with steam. The precipitated product is filtered off, dried and purified by recrystallisation from chlorobenzene. The 3-phenyl-7-[4'-chloropyrazolyl-(1')]-coumarin, M.P. 234°, fluoresces violet in organic solvent. It is very suitable for the brightening of organic materials, especially synthetic textile fibres and polymeric plastics.

Analysis.—$C_{18}H_{11}ClN_2O_2$ (322.74). Calculated (percent): C, 66.98; H, 3.43; Cl, 10.99; N, 8.68. Obtained (percent): C, 66.80; H, 3.43; Cl, 10.91; N, 8.76.

(b) The same product is also obtained by dissolving 15.9 parts of 2-chloromalondialdehyde and 25.2 parts of 3-phenyl-7-hydrazino-coumarin in 250 parts by volume of ethylene glycol monomethyl ether and 50 parts by volume of glacial acetic acid, and heating the obtained solution for 12 hours, while stirring, at 70–80°. During cooling, a light brown precipitate is obtained from the dark brown solution. The precipitate is filtered off, washed with glacial acetic acid and water and purified by recrystallisation from chlorobenzene.

EXAMPLE 4

15.8 parts of 3 - phenyl-7-[3',5'-dimethyl-pyrazolyl-(1')]-coumarin are dissolved in 350 parts by volume of tetrachloroethane while stirring; to the obtained solution, there are added dropwise 8.7 parts of sulfurylchloride at 15–17° within 1 hour while stirring. During the addition of the sulfurylchloride, the chlorinated pyrazolylcoumarin precipitates. After the addition of the sulfurylchloride the obtained suspension is stirred for 15 hours at 20°. The precipitate is filtered off, dryed and recrystallised from toluene. 3-phenyl-7-[3',5' - dimethyl-4'-chloropyrazolyl (1')]-coumarin is obtained in form of white crystals. M.P. 215°–6°.

Analysis.—$C_{20}H_{15}ClN_2O_2$ (350.70). Calculated (percent): C, 68.47; H, 4.30; Cl, 10.11; N, 7.99; O, 9.13. Obtained (percent): C, 68.47; H, 4.35; Cl, 10.38; N, 8.02; O, 9.11.

EXAMPLE 5

An amount of 0.2 g. of trichlorobenzene is added to 100 ml. of water. A stock solution is prepared of the optical brightener by dissolving 1 g. of 3-phenyl-7-[3'-methyl-4'-chloropyrazolyl-(1')]-coumarin in 1000 ml. of ethylene glycol monoethyl ether. 3 ml. of this stock solution are added to the above described aqueous solution.

This aqueous solution containing the brightener is heated to 60° and a polyester fabric weighing 3 g. is introduced into the solution. The temperature is raised within 10–15 minutes to 95–98° and the whole is allowed to stand for 1 hour at this temperature. The fabric is rinsed and dried.

The fabric treated in this manner has a clearly whiter and more brilliant appearance than the untreated starting material.

The polyester used in this and subsequent examples is polyethyleneglycolterephthalate.

EXAMPLE 6

To 100 ml. of water are added 0.2 g. of sodium chlorite, 0.2 g. of sodium nitrite and 0.2 g. of oxalic acid and 3 ml. of the stock solution of the brightener 3-phenyl-7-[3'-methyl-4'-chloropyrazolyl-(1')] - coumarin described in Example 4. In addition, an amount of 0.2 g. of trichlorobenzene is added to this aqueous solution.

The solution is heated to 60° and a polyester fabric weighing 3 g. is introduced into the solution. The temperature is increased with 10 to 15 minutes to 65° and the whole is allowed to stand for 30 minutes at this temperature. The temperature is then raised to 98–100° and the treatment proceeds for a further 30 minutes at this temperature. The fabric is rinsed and dried.

The thus treated fabric has a clearly whiter and more brilliant appearance than the starting material.

EXAMPLE 7

To 285 ml. of water are added 0.3 g. of an alkylpolyglycol ether and 0.15 g. of trichlorobenzene. A solution is produced of the optical brightener prepared according to Example 1, by dissolving 1 g. of the brightener in 1000 ml. of ethylene glycol monoethyl ether. 15 ml. of this stock solution are added to the above described solution.

This aqueous solution containing the brightener is heated to 20–30° and a polyester fabric weighing 15 g. is introduced into the solution. The temperature is increased within 30 minutes to 160° and the whole is allowed to stand for 30 minutes at this temperature, whereupon it is cooled within 15–20 minutes to 60°. The fabric is rinsed and dried.

The fabric treated in this manner has a clearly whiter and more brilliant appearance than the untreated starting material.

EXAMPLE 8

An amount of 0.2 g. of the sodium salt of the dioctyl sulphosuccinic acid ester is added to 100 ml. of water. A 10% mixture of the optical brightener, according to Example 1, milled in sand is produced. Of this mixture, 3 g. are added to the above described aqueous solution. This solution is then used to pad (squeezing effect 50–60%) a polyester fabric at 20° (roller pressure 30 kg./cm.$^2$, speed 3 m./min.). The fabric is dried at ca. 60° and the dried fabric fixed for 30 seconds at 200°.

The thus treated fabric has a clearly whiter, more brillant appearance compared with the untreated starting material.

EXAMPLE 9

To 100 ml. of water are added 0.12 ml. of formic acid (85%) and 0.06 g. of an alkylpolyglycol ether. A solution is prepared of the optical brightener, produced according to Example 1, by dissolving 1 g. thereof in 1000 ml. of ethylene glycol monoethyl ether. 1.5 ml. of this stock solution are then added to the above described aqueous solution.

This aqueous solution containing the brightener is heated to 60° and 3 g. of nylon staple fabric are introduced into the solution. The temperature is raised within 10–15 minutes to 90–92° and this temperature is maintained for 30 minutes. The fabric is rinsed and dried.

The thus treated fabric has a clearly whiter and more brilliant appearance compared with the untreated starting material.

EXAMPLE 10

To 100 ml. of water are added 0.4 g. of a washing agent having the following composition:

| | Percent |
|---|---|
| Dodecylbenzene sulphonate | 16 |
| Fatty alcohol sulphonate | 4 |
| Na-tripolyphosphate | 35 |
| Tetra-sodium pyrophosphate | 7 |
| Mg-silicate (Na$_2$(SiO$_3$)$_2$) | 2 |
| Na-disilicate (MgSiO$_3$) | 7 |
| Carboxymethyl cellulose | 1 |
| Ethylene diamine tetraacetic acid | 0.5 |
| Glaubers salt, ca. | 25 |
| Water | 2.5 |

A solution is prepared of the optical brightener, according to Example 1, by dissolving 1 g. thereof in 1000 ml. of ethylene glycol monoethyl ether. 1 ml. of this stock solution is then added to the above described aqueous solution.

This aqueous solution containing the brightener is heated to 55–60° and 3 g. of polyamide fabric are introduced into the solution. This temperature is maintained for 20 minutes and the fabric is then rinsed and dried.

The thus treated fabric has a clearly whiter appearance than the untreated starting material.

EXAMPLE 11

1000 parts of polyester granulate made from polyterephthalic acid ethylene glycol are intimately mixed with 0.2 part of 3 - phenyl - 7 - [3'-methyl-4'-chloropyrazolyl-(1')]-coumarin. From an extruder and under nitrogen, the mixture is then spun into threads at a temperature of 260–285°, in a known manner, through a spinning nozzle. The thus obtained polyester threads have a high degree of whiteness and have an excellent fastness to light and washing.

A similar effect is obtained if, in the above example, the applied brightener is replaced by 0.2 part of 3-phenyl-7-[3',5' - dimethyl - 4' - chloropyrazolyl - (1')] - coumarin or 3-phenyl-7-[4'-chloropyrazolyl-(1')]-coumarin.

EXAMPLE 12

1000 parts of granulated polyterephthalic acid ethylene glycol are mixed with 1 part of finely pulverised 3-phenyl-7-[3' - methyl - 4' - chloropyrazolyl-(1')]-coumarin for 3 hours in a revolving vessel. The granulate is then extruded by means of a screw press at a mixture temperature of 250° as an endless spiral of 2 mm. diameter, and subsequently granulated.

The material obtained in this manner, has an improved colour compared with the starting granulate, i.e. it has a high degree of whiteness. Using the standard equipment, it can be spun into filaments having a brilliant grade of whiteness.

EXAMPLE 13

100 parts of polypropylene are homogenised with 0.5 part of titanium dioxide and 0.06 part of 3-phenyl-7-[3' - methyl - 4' - chloropyrazolyl-(1')]-coumarin in a kneading machine at 200°. The melt is spun under inert gas at 2–3 atmospheres and at a temperature or 280–300°, in a known manner, through spinning nozzles. The thus obtained polypropylene threads are characterised by a high degree of whiteness.

A similar effect is obtained if, in the above example, the applied brightener is replaced by 0.06 part of 3-phenyl - 7 - [3',5'-dimethyl - 4' - chloropyrazolyl - (1')]-coumarin or 3 - phenyl 7 - [4' - chloropyrazolyl - (1')]-coumarin.

EXAMPLE 14

0.06 part of 3 - phenyl - 7 - [3' - methyl - 4' - chloropyrazolyl-(1')]-coumarin are gelatinised with a mixture consisting of 67 parts of polyvinyl chloride powder, 33 parts of dioctyl phthalate, 2 parts of di-n-butyldilauryldioxystannate and 0.3 part of sodium pentaoctyl tripolyphosphate for 15 minutes on the mixing rollers at 160°, and subsequently extended into films.

The thus produced polyvinyl chloride film exhibits in daylight a violet fluorescence and has a clearly whiter appearance than corresponding films produced without the addition of this brightening agent.

EXAMPLE 15

In a high-grade steel autoclave provided with a stirrer, gas-inlet tube, vacuum arrangement, descending condenser, nozzle in the bottom which can be closed, a charging valve and heating jacket, 388 g. of benzene-1,4-dicarboxylic acid dimethyl ester, 300 g. of 1,2-ethane diol and 0.4 g. of antimonoxide are heated, while blowing through pure nitrogen, to an external temperature of 200°. This temperature is maintained for 3 hours, whereby methanol slowly distills off. While excluding air, 0.4 g. of 3 - phenyl - 7 - [3'-methyl-4'-chloropyrazolyl-(1')]-coumarin, dissolved in 40 g. of 1,2-ethane diol, are carefully fed into the autoclave after the temperature has been allowed to fall to 190°. After the addition is completed, the temperature is raised within one hour to an external temperature of 285°, whereby 1,2-ethane diol distills off. The autoclave is then put under vacuum, the pressure slowly reduced to 0.2 torr and the condensation completed over a period of 3 hours under these conditions. Thorough stirring is maintained during these operations. The liquid condensation polymer is then extruded by nitrogen pressure through the bottom nozzle. Monofilaments can be produced from the thus obtained polymers having a brilliantly white appearance.

Similar effects, as described in examples 5 to 15 are obtained if in these examples the 3-phenyl-7-[3'-methyl-4'-chloropyrazolyl-(1')]-coumarin is replaced by substances specifically mentioned in claims 4, 5 and 6.

We claim:
1. A compound of the formula

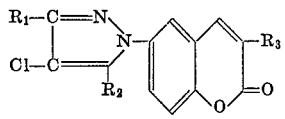

wherein $R_1$ and $R_2$ each represent hydrogen, alkyl having 1-4 carbon atoms, halogen up to atomic number 35, the trifluoromethyl group, a phenyl radical, a phenyl radical substituted by alkyl having 1 to 4 carbon atoms, halogen, alkoxy having 1 to 4 carbon atoms, sulphamoyl, N,N-dialkylsulphamoyl having 1 to 4 carbon atoms, wherein each alkyl group has 1 to 4 carbon atoms, or alkylsulphonyl wherein the alkyl group contains 1-4 carbon atoms, and $R_3$ represents a phenyl radical or a phenyl radical substituted by chlorine or methyl.

2. A compound as defined in claim 1, wherein $R_1$ is selected from hydrogen, methyl, trifluoromethyl, phenyl or tolyl, $R_2$ is selected from hydrogen, methyl, chlorine or trifluoromethyl, and $R_3$ is a phenyl radical or a phenyl radical substituted by chlorine or methyl.

3. A compound as defined in claim 1, wherein $R_1$ represents methyl or phenyl,
$R_2$ represents hydrogen, and
$R_3$ represents phenyl.

4. A compound as defined in claim 1, which is 3-phenyl-7-[3'-methyl-4'-chloropyrazolyl-(1')]-coumarin.

5. A compound as defined in claim 1, which is 3-phenyl-7-[3'-phenyl-4'-chloropyrazolyl-(1')]-coumarin.

6. A compound as defined in claim 1, which is 3-phenyl-7-[3'-p-tolyl-4'-chloropyrazolyl-(1')]-coumarin.

References Cited
UNITED STATES PATENTS

| | | | |
|---|---|---|---|
| 1,915,334 | 6/1933 | Salzberg et al. | 260—243 |
| 2,075,359 | 3/1937 | Salzberg et al. | 424—250 |

FOREIGN PATENTS

| | | | |
|---|---|---|---|
| 688,871 | 6/1964 | Canada | 260—310 R |

HENRY R. JILES, Primary Examiner

S. D. WINTERS, Assistant Examiner

U.S. Cl. X.R.

8—1 W, 179, 178 R, 177 R, 180; 260—343.2 R